United States Patent
Segal et al.

(10) Patent No.: US 6,603,652 B1
(45) Date of Patent: Aug. 5, 2003

(54) MOTOR CAPACITOR PROTECTIVE ASSEMBLY

(75) Inventors: David A. Segal, Dallas, TX (US); Robert M. Hyatt, Jr., Lansdale, PA (US); Jason D. Diltz, South Plainfield, NJ (US)

(73) Assignee: Howell Electric Motors, Plainfield, NJ (US)

( * ) Notice: Subject to any disclaimer, the term of this patent is extended or adjusted under 35 U.S.C. 154(b) by 0 days.

(21) Appl. No.: 09/723,576

(22) Filed: Nov. 28, 2000

(51) Int. Cl.[7] ................................. H01G 4/00
(52) U.S. Cl. ................. 361/301.3; 361/272; 361/275; 361/301.1; 361/306.1
(58) Field of Search ................... 361/301.3, 272, 361/275, 301.1, 306.1, 538, 520, 517, 535, 275.2, 518, 537

(56) References Cited

U.S. PATENT DOCUMENTS

| | | | |
|---|---|---|---|
| 3,806,770 A | 4/1974 | Voyles et al. | |
| D245,498 S | 8/1977 | Andreas | |
| 4,208,699 A | 6/1980 | Philpott et al. | |
| 4,286,302 A | 8/1981 | Owens et al. | |
| 4,360,848 A | 11/1982 | Noutko et al. | |
| 4,571,662 A | 2/1986 | Conquest et al. | |
| 4,649,305 A * | 3/1987 | Morrill | 310/72 |
| 4,754,361 A | 6/1988 | Venturini | |
| 4,868,717 A | 9/1989 | Tyler | |
| D314,742 S | 2/1991 | Sieber | |
| 5,019,934 A | 5/1991 | Bentley et al. | |
| 5,107,393 A * | 4/1992 | Lobo | 361/306 |
| 5,148,347 A * | 9/1992 | Cox et al. | 361/272 |
| 5,381,301 A * | 1/1995 | Hudis | 361/275.2 |
| 5,493,158 A * | 2/1996 | Daniels | 310/68 |
| 6,021,040 A * | 2/2000 | Suzuki et al. | 361/514 |
| 6,229,236 B1 * | 5/2001 | Fisher et al. | 310/89 |
| 6,249,422 B1 * | 6/2001 | Tsai | 361/301.3 |
| 6,310,756 B1 * | 10/2001 | Miura et al. | 361/301.3 |

* cited by examiner

Primary Examiner—Dean A. Reichard
Assistant Examiner—Nguyen Ha
(74) Attorney, Agent, or Firm—Polster, Lieder, Woodruff & Lucchesi

(57) ABSTRACT

A protective cap or top for a capacitor associated with a dynamoelectric machine is provided in a form which prevents electrical contact with foreign objects or the dynamoelectric machine shell if the capacitor is mechanically disassembled from the dynamoelectric machine. In the preferred embodiment, the cap and capacitor are mounted to one another in a manner that prevents separation without destruction of the capacitor.

21 Claims, 2 Drawing Sheets

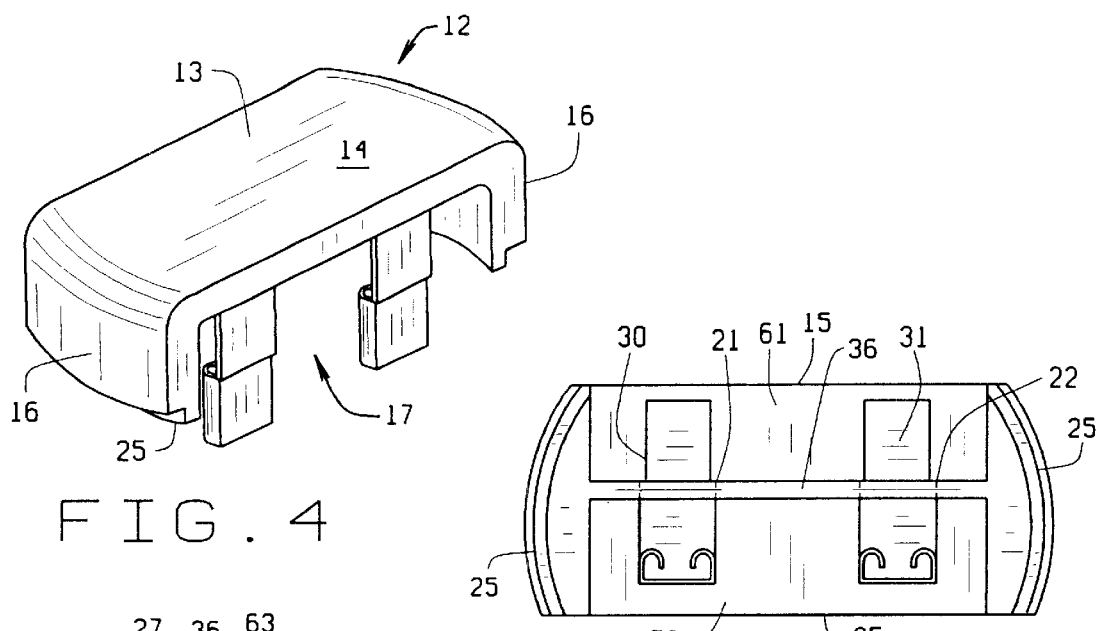
FIG. 4
FIG. 5
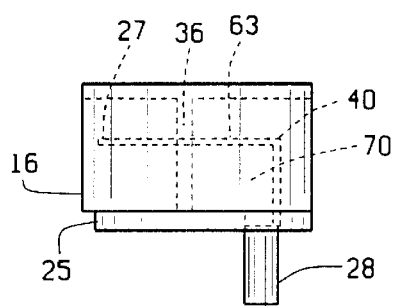
FIG. 6
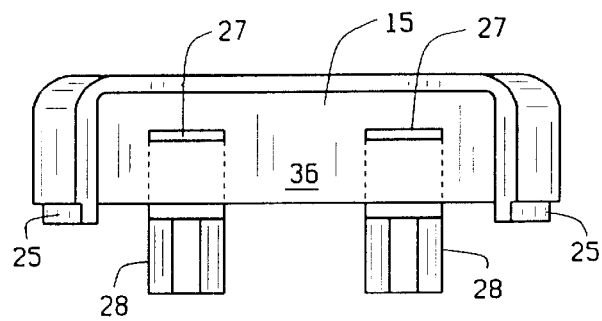
FIG. 7
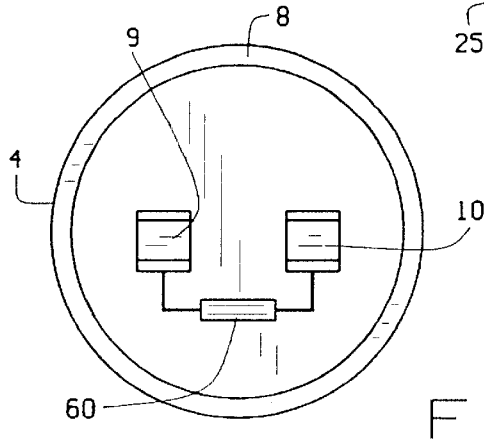
FIG. 8

MOTOR CAPACITOR PROTECTIVE ASSEMBLY

CROSS REFERENCE TO RELATED APPLICATIONS

None

STATEMENT REGARDING FEDERALLY SPONSORED RESEARCH OR DEVELOPMENT

Not applicable.

BACKGROUND OF THE INVENTION

This invention relates to dynamoelectric machines, and in particular, to a protective assembly for a start capacitor of an AC induction motor. While the invention is described with particular reference to its application in AC induction motors, those skilled in the art will recognize the wider applicability of the inventive principles disclosed hereinafter.

During the routine operating life of an AC induction motor, for example, one in which a capacitor is employed in the motor circuit, the capacitor, which is an electronic component, sometimes fails. When this occurs, the normal procedure is to: 1) remove electrical power from the machine; 2) remove the retaining screws or hardware that hold the capacitor in place on the machine; 3) disconnect the leads that provides the electrical energy to the capacitor; 4) remove the capacitor from the container holding the capacitor; 5) replace the capacitor with a new unit; 6) reconnect and reinstall the capacitor to the machine; and 7) reapply power to the machine. Unfortunately, this procedure is not always followed, and that failure has resulted in electrical trauma injury to users in the field. Current mechanical and electrical configurations commonly employed in dynamoelectric machine design permit the start and/or run capacitor to be connected electrically to the dynamoelectric machine without the capacitor being mechanically retained. Electrical connections often are not insulated. This permits contact of the capacitor terminals with the casing or shell of the motor and/or other metallic foreign objects. If the operator or user contacts the case or shell of the motor while the capacitor terminals is in contact with the case and power is applied to the motor, an electrical shock can occur.

In some known cases, individuals have removed start capacitors from their containers and disassembled them, exposing the electrical connections inside the capacitor. In several capacitor designs employed with induction motors, for example, the capacitor can be completely removed from its manufactured container and still function. When this occurs, the wires and contacts that carry electric power to the capacitor are exposed and can be directly contacted by the operator/user. Again, this has the potential to cause electrical trauma to a user.

As will be appreciated by those skilled in the art, if electrical power is disconnected from a capacitor it will retain charge for some period of time. Depending upon the capacitive value of the capacitor, the charge can be significant enough to cause shock trauma to a person who touches the leads of the capacitor. A high resistance resistor placed across the capacitor terminals will not effect operation of the capacitor in its intended application, and will provide a discharge path to drain the charge from the capacitor and reduce it to a point that will not injure a person who touches the leads.

It is also known that if an overcharge or over voltage condition exists in a capacitor, it can release gas from the materials forming the capacitor. These gases will build pressure inside the component until the capacitor explodes, unless the gases are vented. All capacitors manufactured in the United States have vent features to release these gases. The device disclosed hereinafter, while preventing tampering and protecting the electrical integrity of the system, provides a physical path to vent internal gases, should the capacitor be subject to an over voltage condition. While the potential for electric shock has been known in the past, the practical way to prevent it has been lacking. The invention disclosed hereinafter overcomes these prior deficiencies and provides a simple, low cost protective assembly particularly useful in dynamoelectric machine applications.

BRIEF SUMMARY OF THE INVENTION

One of the objects of this invention is to provide an assembly that is intended to prevent electrical shock in dynamoelectric machine applications.

Another object of this invention is to provide a module, which prevents individuals from accessing a capacitor, mounted within the module without totally destroying the capacitor and its functionality.

Another object of this invention is to provide a bleed resistor for capacitors utilized with dynamoelectric machines.

Another object of this invention is to provide a module that protects an individual from shock that may be associated with capacitor use, but provides a vent path for gases that may be generated by the capacitor.

Yet another object of this invention is to provide a method of preventing electrical shock in association with dynamoelectric machine operation.

Still another object of this invention is to provide a modular replacement kit for use with dynamoelectric machines.

Other objects will be apparent to those skilled in the art in light of the following description and accompanying drawings.

In accordance with this invention, generally stated, a module is provided in which a protective top is placed over a capacitor, and the combination is placed within a protective container in a way to prevent removal of the capacitor without physically destroying the integrity of the capacitor. A protective top or cap for the capacitor is provided which prevents electrical contact with the capacitor terminals. A method of preventing electrical shock also is disclosed.

BRIEF DESCRIPTION OF THE SEVERAL VIEWS OF THE DRAWINGS

The objects of the invention are achieved as set forth in the illustrative embodiments shown in the drawings which form a part of the specification, in which:

FIG. 4 is view in perspective of the of protective top or cap for a capacitor shown in FIG. 3;

FIG. 5 is a bottom plan view thereof;

FIG. 6 is a view in side elevation thereof,

FIG. 7 is a view in end elevation thereof; and

FIG. 8 is a top plan view of the capacitor shown in FIG. 3.

Corresponding reference characters indicate corresponding parts throughout the several views of the drawings.

DETAILED DESCRIPTION OF INVENTION

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. As various changes could be made in the above constructions without departing from the scope of the invention, it is intended that all matter contained in the above description or shown in the accompanying drawings shall be interpreted as illustrative and not in a limiting sense.

Figure 1:
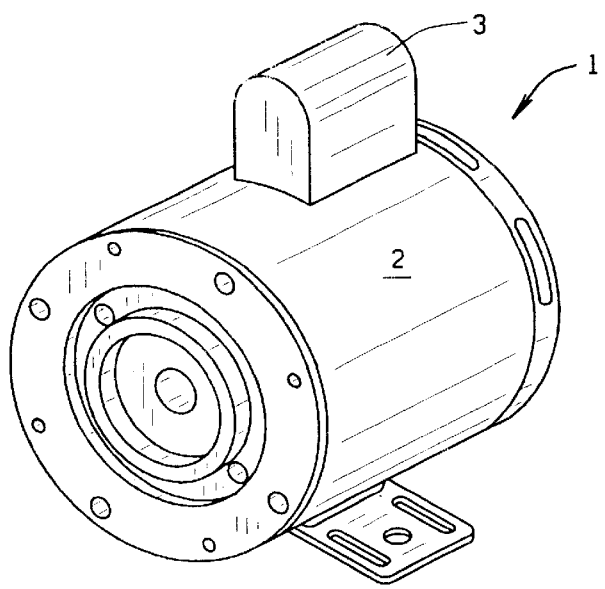
FIG. 1 is a view in perspective of a dynamoelectric machine employing the module of the present invention.

Referring now to FIG. 1, reference numeral 1 indicates one illustrative embodiment of a dynamoelectric machine employing our invention. The dynamoelectric machine includes a shell 2 having a capacitor can or enclosure 3 mounted to it. As will be appreciated by those skilled in the art, the AC induction motors in the form of capacitor start and/or capacitor run induction motors, for example, employ a capacitor in the motor circuit. The motor design and the type of motor per se forms no part of the invention, it being the intention of our invention to protect a user against electrical shock that may occur when the capacitor contained within the capacitor can 3 requires replacement.

Figure 2:
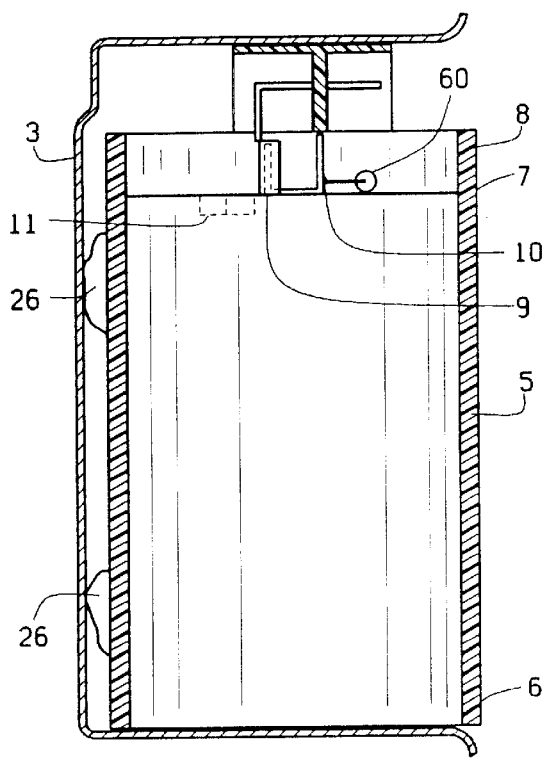
FIG. 2 is a view in side elevation, partly in section, showing one illustrative embodiment of the module of the present invention.

Referring now to FIG. 2, the capacitor can 3 has a capacitor 4 associated with it. The capacitor 4 is conventional and commonly includes a capacitor enclosure 5 having a lower end 6 and an upper end 7. The capacitor design silhouette may vary, and the design selected depends in large measure on the particular manufacturer of the capacitor. In any event, the capacitor 4 is a cylindrical structure in the embodiment illustrated. It is common for the capacitor 4 to have a rim 8 along the upper end 7 of the capacitor. Internally mounted along the upper end 7 of the capacitor 4 is a pair of dual male capacitor terminals 9 and 10 respectively. Commonly, the terminals are mounted within and below the rim 8.

As shown in FIG. 2, the capacitor 4 includes a vent structure 11 which permits venting of gases formed in the capacitor due to over voltage conditions on the capacitor. Referring now to FIGS. 4–7, the capacitor 4 is provided with a protective top or cap 12 that is configured to mount to the capacitor. The protective cap 12 includes an enclosure 13 having a top wall 14, a generally open front 15, a side wall 16, a generally open back 35 and a generally open bottom 17. The enclosure 13 has a solid wall 36 separating the front 15 from the back 35 so as to define a capacitor connection area 70 and an external connection area 61. As indicated above, the capacitor 4, in the embodiment illustrated, has a pair of dual male terminals 9 and 10 associated with the capacitor structure. The wall 36 of the enclosure 13 has a pair of channels 21 and 22 respectively, formed in it, communicating with the connection areas 70, 61. The channels 21 and 22 are intended to receive a pair of electrical terminals 30, 31 to permit inter connection of the capacitor 4 to an external device, for example, the dynamoelectric machine 1. As will be observed in FIG. 5, the channels 21, 22 are molded to the electrical terminals 30, 31. The male end of the terminals 30, 31 are flag terminals, which connect to insulated female leads, not shown, for connecting the capacitor 4 to its intended application. The female end of the terminals are isolated from physical contact by the wall 36 of the enclosure. More particularly, each of the terminals 30, 31 has a first male end 27 and a second female end 28. The end 27 connects the capacitor 4 to the external device, while the end 28 accepts one of the male terminals of capacitor terminals 9 and 10. The terminals 30, 31 each have a body 63 that is constructed and arranged to define a junction 40, formed along an angle 70, which in the embodiment illustrated is approximately ninety (90) degrees.

Figure 3:
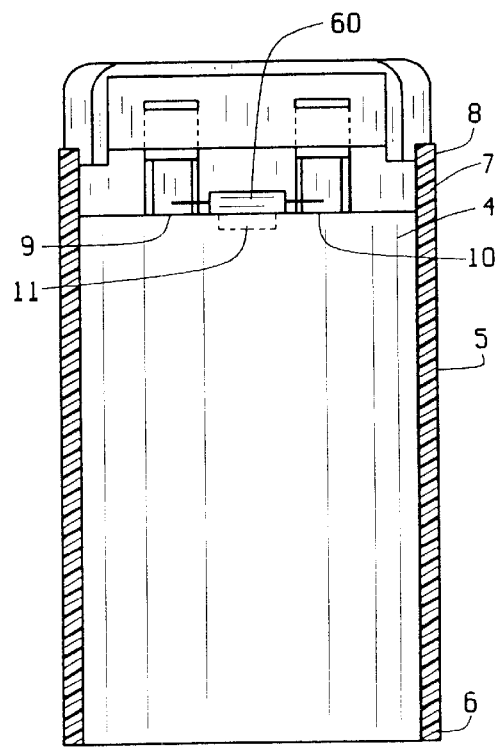
FIG. 3 is a view in side elevation, partly in section, of one illustrative embodiment of a capacitor and protective cap or top employed with the module shown in FIG. 2.

The side wall 16 of the enclosure 13 defines a lip 25. The lip 25 is intended to mount internally of the rim 8 of the capacitor 4, as best shown in FIGS. 2 and 3. The enclosure 13 is constructed and arranged so that the lip 25 fits into the rim 8 in a slip fit. Alternatively, the lip 25 may be mounted externally of the rim 8. Other mounting arrangement will occur to those skilled in the art. Again, because of the design, the cap 12 provides a clear path for venting the capacitor 4, should that be required. As shown in FIG. 2, the capacitor 4 and cap 12 then are inserted within the capacitor can 3. Besides the tight friction fit between the cap and the can, additional epoxy or other suitable adhesive material 26 may be employed to bond the can 3 and capacitor/capacitor cap combination in position, if desired.

Another feature of our invention is the provision of a bleed resistor 60, connected between the capacitor terminals 9 and 10, as is best seen in FIGS. 2, 3 and 8. The resistor 60 value is chosen to provide a bleed path of the capacitor 4, without affecting the applicational use of the capacitor. While bleed resistors are well known in the art, the use of the cap 12 prevents access to the resistor 60 or terminals 9 and 10 in the intended application.

As will be appreciated by those skilled in the art, the combined capacitor can 3 and capacitor 4/cap 12 unit may be sold in kit form. In the alternative, the cap 12 may be attached to the capacitor 4 and sold in that fashion. In any event, the interconnection between the capacitor/capacitor cap and capacitor can is intended to prevent their separation without effective destruction of the capacitor in applicational use.

Numerous variations within the scope of the appended claims will be apparent to those skilled in the art in light of the foregoing description and accompanying drawings. Thus, the design silhouette of the cap 12 may vary in other embodiments of the invention. We prefer to mold the cap 12 from a rigid electrically insulating material. Likewise, while we have employed flag terminals within the cap 12, other terminal designs may be used. While the terminals were described as male and female configurations, the particular part arrangement may be reversed in their functional application, or changed to other terminal designs. The capacitor 4 shown and described has a cylindrical silhouette. Other configurations may be employed, if desired. These variations are merely illustrative.

In view of the above, it will be seen that the several objects and advantages of the present invention have been achieved and other advantageous results have been obtained.

What is claimed is:

1. In an electric motor having a shell, a capacitor can mounted to the shell, and a capacitor positioned in the capacitor can, the capacitor having a casing and terminals projecting outwardly from the casing, the improvement which comprises as separate component, a non conductive protective cap mountable to the casing of capacitor, the cap having at least one terminal channel formed in it for interconnecting the capacitor to an external device, and at least one terminal in said channel, said terminal having first and second ends and a body part there between, the body part forming an oblique angle between the first and second ends.

2. The improvement of claim 1 wherein the cap has a lip formed at least partially about it, the capacitor casing including an enclosure defining a rim, the lip of said cap engaging the rim of the capacitor.

3. The improvement of claim 2 wherein the capacitor has a design silhouette, and the design silhouette of the capacitor cap is constructed to conform to the capacitor design silhouette.

4. The improvement of claim 3 further including an adhesive material between at least the capacitor can and one of the protective cap and the capacitor.

5. The improvement of claim 3 further including adhesive material between the capacitor can, the protective cap, and the capacitor.

6. The improvement of claim 4 wherein the terminals for interconnecting the capacitor to an external device are insulated terminals.

7. The improvement of claim 6 further including a bleed off resistor operatively connected to the terminals of the capacitor.

8. The improvement of claim 7 wherein the protective cap is molded from an electrically insulating material.

9. A protective cap for a capacitor, the capacitor having a casing and at least a pair of terminals extending outwardly from the casing, comprising:
   a body having a top wall and at least one side wall extending downwardly from the top wall, the side wall having a lip formed in it configured to receive the capacitor casing;
   at least a first area in said body sized to accept the terminals of said capacitor;
   first and second channels in said body, respective ones of said first and second channels communicating with said first area: and
   first and second terminals in said channels, said terminals having a male end and female end positioned at an angle with respect to one another.

10. The protective cap of claim 9 wherein the angle approximately is 90 degrees.

11. The protective cap of claim 10 wherein the body is constructed from an electrically insulating material.

12. The protective cap of claim 11 further including an adhesive bonding material between the protective cap and the capacitor casing.

13. A replacement capacitor kit for a dynamnoclectric machine comprising:
   a capacitor including an enclosure, the enclosure having at least a first pair of terminals extending outwardly there from;
   a protective cap formed as a separate component mountable to the enclosure and encompassing the at least a first pair of terminals for preventing unintentional electrical contact with the capacitor, the capacitor having said cap attached to it, said protective cap and capacitor being mounted to said dynamoelectric machine in a manner to prevent removal from said machine in normal intended use without destroying the usefulness of the capacitor for its normal intended use.

14. The kit of claim 13 wherein said protective cap includes a body having a top wall and at least one side wall extending downwardly from the top wall, the side wall having a lip formed in it configured to receive the capacitor enclosure, the capacitor enclosure being sized for reception along the lip of the protective cap.

15. The kit of claim 14, wherein the lip is positioned at least partly externally of the capacitor enclosure.

16. The kit of claim 14 wherein said body has a first channel sized to receive a first flag terminal for interconnection with said capacitor, and a second channel formed in said body for reception of a second flag terminal for interconnection with said capacitor.

17. The kit of claim 15 wherein the protective cap and the capacitor are attached to one another with a bonding material.

18. The kit of claim 17 wherein the bonding material is an epoxy.

19. The kit of claim 17 further including a capacitor can.

20. The kit of claim 17 further including bonding material between at least one of the protective cap, the capacitor and the capacitor can.

21. The kit of claim 17 further including a resistor electrically connected to the capacitor.

* * * * *

UNITED STATES PATENT AND TRADEMARK OFFICE
CERTIFICATE OF CORRECTION

PATENT NO. : 6,603,652 B1
DATED : August 5, 2003
INVENTOR(S) : David A. Segal, Robert M. Hyatt, Jr. and Jason D. Diltz It is certified that error appears in the above-identified patent and that said Letters Patent is hereby corrected as shown below:

<u>Column 6,</u>
Line 6, replace "dynamnoclectric" with -- dynamoelectric --

Signed and Sealed this

Third Day of February, 2004

JON W. DUDAS
*Acting Director of the United States Patent and Trademark Office*